United States Patent

Hancks et al.

[15] 3,706,293
[45] Dec. 19, 1972

[54] STEERABLE SELF-PROPELLED SUBMERSIBLE

[72] Inventors: Dorothy B. Hancks; Stephen F. Moran, both of San Diego, Calif.

[73] Assignee: The United States of America as represented by the Secretary of the Navy

[22] Filed: Aug. 27, 1970

[21] Appl. No.: 67,461

Related U.S. Application Data

[63] Continuation-in-part of Ser. No. 745,633, July 17, 1968, Pat. No. 3,565,028.

[52] U.S. Cl. ................................. 114/20, 114/23
[51] Int. Cl. .......................... F42b 19/01, F42b 19/12
[58] Field of Search ............... 114/20 R, 20 A, 23

[56] References Cited

UNITED STATES PATENTS

| | | | |
|---|---|---|---|
| 3,301,210 | 1/1967 | Oezand, Jr. | 114/20 R |
| 3,162,162 | 12/1964 | Hamlin et al. | 114/23 |
| 3,356,150 | 12/1967 | Ruszczycky et al. | 114/23 X |

Primary Examiner—Benjamin A. Borchelt
Assistant Examiner—James M. Hanley
Attorney—Richard S. Sciascia, Ervin F. Johnston and Thomas G. Keough

[57] ABSTRACT

In a torpedo having a pair of counterrotating propellers mounted on coaxially-disposed shafts, a new sealing arrangement is provided that overcomes limitations encountered when combination carbon seals are used to shut out ambient water from a watertight compartment. Contemporary carbon seals exhibit two limitations; first, they require a critical axial pressure between adjacent carbon surfaces and polished wear surfaces, and second, they cannot tolerate slight axial displacement of the seals with respect to their wear surfaces since both conditions allow water to bypass them. A pair of shaft sealing assemblies is included which seal off the juncture between the inner shaft and the outer shaft, and a fitting reaches into the watertight compartment rendering the assemblies independent of axial pressures and slight axial excursions. An angularly displaceable shroud, used to change the direction of the torpedo, is carried on the socket portion of a ball-and-socket joint and is biased to a neutral position by a plurality of bolts carrying biasing springs, spaced in quadrature, to minimize frictional drag between the bolt faces and the socket.

3 Claims, 2 Drawing Figures

PATENTED DEC 19 1972 3,706,293

INVENTORS
DOROTHY B. HANCKS
STEPHEN F. MORAN

THOMAS G. KEOUGH
ERVIN F. JOHNSTON
ATTORNEYS

STEERABLE SELF-PROPELLED SUBMERSIBLE

CROSS-REFERENCE TO RELATED APPLICATION

This invention is a continuation-in-part of application Ser. No. 745,633 filed July 17, 1968 now U.S. Pat. No. 3,565,028 issued Feb. 13, 1971 and entitled "Steerable Self-Propelled Submersible".

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Submersibles, or more particularly torpedoes, having a pair of counterrotating shafts and being steerable by means of an annular-shaped shroud mounted on a pivotal ball-and-socket member are well established in the art as having improved, if not superior, speed and handling characteristics. The above-identified application patent application discloses a torpedo using composite, carbon seals for sealing the juncture areas between the inner shaft and the outer shaft, and the outer shaft and the socket portion of a ball-and-socket fitting. A limitation of this design became apparent whenever there was even the slightest axial displacement of either of the shafts; when the shafts moved, the sealed relationship between a watertight compartment and the ambient water vanished and the compartment flooded. In addition, since carbon seals must have a bearing pressure between the carbon portions and the bearing surfaces within predetermined limits, final adjustment and seating of the seals to ensure reliable sealing always call for disassembly and final pressure adjustments from within the watertight compartment. Thus, whenever regularly scheduled inspection and maintenance are performed, the carbon seals' wearing surfaces are inspected and a time-consuming reassembly and adjustment procedure is in store. Another limitation of the afore-mentioned design arises by having bolt-carrying biasing springs, which position the shroud in a neutral position, exerting a canted, neutralizing force against bearing surfaces on the socket portion of the ball-and-socket joint. The canted, neutralizing force creates a frictional drag and, frequently, the marginal force, produced by the solenoids when a directional change signal is received, is insufficient to overcome the drag and the shroud is not responsively angularly displaced.

SUMMARY OF THE INVENTION

The present invention is directed to providing an improvement in torpedoes having counterrotating propellers and an angularly displaceable shroud. A pair of sealing assemblies, each including at least two O-rings separated by an annular oil-filled reservoir, effectively seals juncture areas between rotating elements. Furthermore, the assemblies do not require a total absence of axial motion by the propeller shafts, nor are pressures between elements critical. A further improvement resides in employing a plurality of quadrature-spaced, biasing spring combinations to exert their shroud-neutralizing forces in a direction angularly opposite the angular motion traveled by the socket and shroud when directional changes are being made.

An object of the invention is to provide a novel sealing arrangement allowing ease in maintenance and inspection.

Another object is to provide an improved steerable, self-propelled submersible permitting reliable control due to the orientation of internal neutralizing-biasing combinations.

Still another object is to provide a sealing assembly for counterrotating shafts that maintains a sealed condition irrespective of slight, axial displacements and variations in pressures between the seals and adjacent rotating elements.

An ultimate object of the invention is to provide sealing assemblies and shroud neutralizing mechanisms constructed of minimal parts ensuring higher reliability and ease of operation.

These and other objects of the invention will become more readily apparent from the ensuing specification when taken with the drawings.

DESCRIPTION OF THE PREFERRED EMBODIMENT

Figure 1:
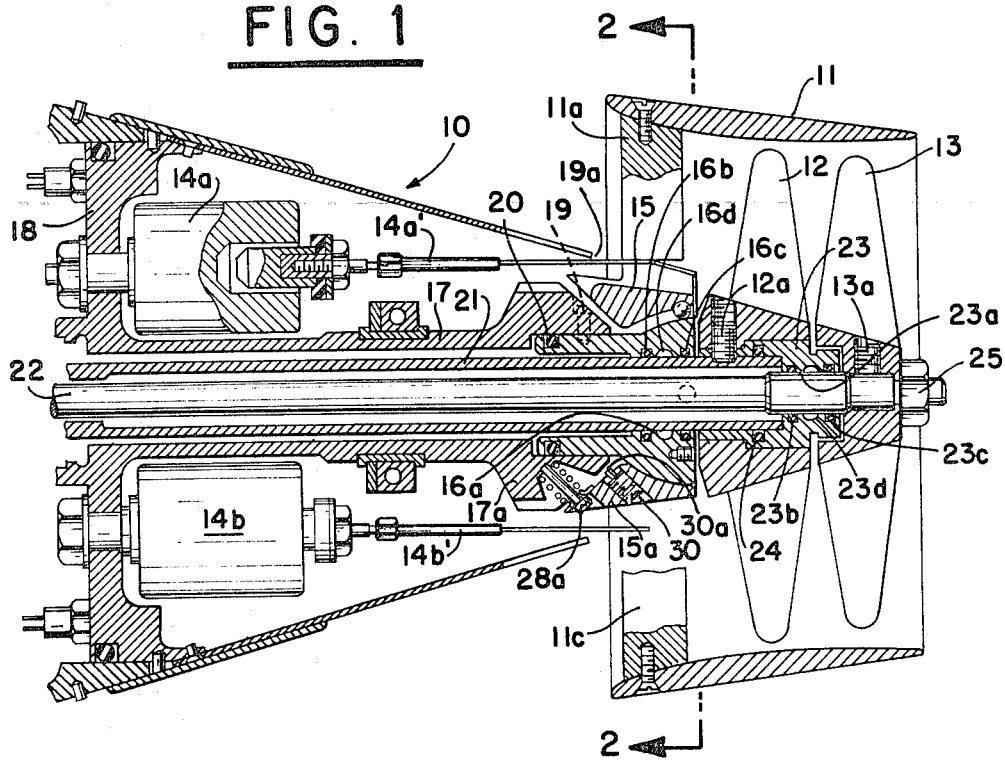
FIG. 1 is a sectional view of the preferred form of the invention taken generally along lines 1—1 in FIG. 2.

Referring now to the drawings, the overall configuration of a torpedo 10 and internal machinery is substantially similar to that disclosed in the above-identified issued patent. Insofar as the present drawings reflect structural variations or omissions, let it suffice to say that such variations or deletions are made to simplify the drawings and to focus attention on the present inventive concept.

Carried on the aftextension of the torpedo, an annular shroud 11 circumferentially encircles a pair of propellers, an inboard propeller 12, an outboard propeller 13. The shroud is carried on a plurality of radially extending struts 11a, 11b, 11c, and 11d for transmitting rotational controlling forces to effect changes in the torpedo's azimuth and elevation via the shroud.

A plurality of solenoids, only two, 14a and 14b, being shown in FIG. 1, are mounted on a bulkhead 18 and spaced 90° apart. Through appropriate linkages 14a' and 14b', directional correcting forces are transmitted to the shroud when suitable control signals are received by the solenoids.

When the control signals are received by the plurality of solenoids, the shroud is free to pivot or articulate on a ball-and-socket joint having a socket portion 15 secured to the plurality of struts and a ball portion 16 fitted into an elongate, axial, tubular section 17 integral with and extending from the bulkhead which separates a watertight compartment housing ordnance, electronics, etc. from the aforementioned structure.

The ball portion is close-fitted into the axial, tubular section and secured in place by a pair of ball-set-screws disposed in a 90° angular relationship, only one ball-set-screw 19 being shown in the drawings. An access port 19a is provided in the shell of the torpedo and is sized to allow a screwdriver to loosen or tighten the ball-set-screw without requiring removal or disassembly of the torpedo shell. Since a possible pathway for water, especially water under high pressure, exists along the length of the tapped holes receiving the ball-set-screws, an O-ring 20 is included to seal this pathway between the axial, tubular section's interior and the exterior of the ball portion.

Internally, through an axial bore 16a provided in the ball portion, an outer, hollow drive shaft 21 extends from torpedo driving machinery to inboard propeller 12 and has an outer diameter slightly smaller than the inner diameter of the axial bore to allow free rotation of the shaft. The small tubular-shaped gap between the ball portion and the outer, hollow shaft is sealed shut by a pair of O-rings 16b and 16c along with an annular recess 16d forming a reservoir for containing oil or a similar lubricant. The mechanical cooperation of the O-rings and oil reservoir ensures a watertight connection to maintain the integrity of the watertight compartment.

Concentrically, and axially extending with the outer shaft, a solid inner shaft 22 extends beyond the aftmost extension of the outer, hollow shaft. Clearances between the shafts form a tubular conduit, which, if not sealed, would allow water to enter the watertight compartment.

Securing inboard propeller 12 onto the aftmost extension of the outer, hollow shaft by an inboard set-screw 12a creates another path through which water could enter the watertight compartment via the tubular conduit. To block this water path, a bearing-seal assembly 23 is force-fitted within inboard propeller 12 and includes an O-ring 24.

The bearing-seal assembly is reamed with an axial bore 23a of slightly greater inner diameter than the outer diameter of the solid inner shaft allowing free rotation of the shaft. The clearances create a cylindrical duct in communication with the tubular conduit. However, this duct is sealed with a pair of O-rings 23b and 23c having an interposed annular recess 23d forming a reservoir for storing a suitable lubricant, such as oil.

Mounting propeller 13 onto the inner shaft with an outboard set-screw 13a does not require additional seals or O-rings since the propeller and set-screw juncture are removed from the torpedo's interior. A nut 25, threaded onto the inner shaft, aids in holding the propellers on the inner and outer shaft and also requires no sealing.

Figure 2:
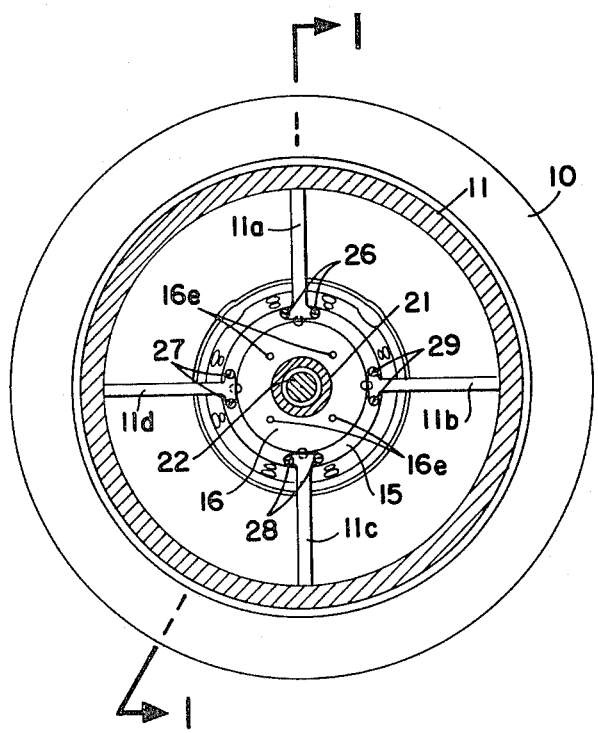
FIG. 2 is an end view of the invention taken generally along lines 2-2 in FIG. 1.

Periodic maintenance is greatly facilitated by the disclosed structure since, by simply removing nut 25 and set-screws 12a and 13a, the propellers are slid off their respective shafts. On the rearward face of ball portion 16, a plurality of tapped bores 16e, see FIG. 2, are formed to receive the correspondingly tapped bolts of a gear-puller-like apparatus to withdraw the ball portion 16 from axial tubular section 17 after ball-set-screw 19 has been unscrewed by a screwdriver inserted through access port 19a. Complete inspection is simply, visually accomplished and replacement of O-rings and lubricant is performed with minimal effort. Simple reinsertion of the elements, securing of the set-screws, and tightening of nut 25 rapidly ready the torpedo for use.

As is the case with conventionally used annular composite carbon seals, pressures between the carbon surfaces and wear surfaces are critical, that is to say, too much bearing pressure existing between the carbon surfaces and the wear surfaces causes rapid deterioration of the carbon, and failure; too little pressure, and no seal is created. Using brittle carbon seals in place of the above-disclosed sealing assemblies requires a final, internal adjustment from within the watertight compartment after the propellers are in place. Needless to say, this additional adjustment is considerably time-consuming and requires trained personnel for proper installation.

With the above-disclosed sealing arrangement, axial pressures between elements and slight axial travel by the shafts are not critical, and the sealing surfaces mechanically engage rotating shafts to isolate the watertight compartment from the ambient water.

A further improvement over the above-identified pending patent application resides in the installation of four sets of bolt-carrying biasing springs 26, 27, 28, and 29, mounted in quadrature between a radially outward extension 17a of axial, tubular section 17 and an outer lip 15a of socket portion 15. Noting FIG. 1, one spring encircled bolt 28a is shown with the spring held in compression to urge the shroud to a neutral position directing the torpedo on a straight-line path. The bolts are individually shimmed and adjusted to achieve the neutral positioning.

After the solenoids have angularly displaced the shroud setting the torpedo on a new course and the control signal has been removed from the solenoids, the four sets of biasing springs mechanically coact to return the shroud to the neutral position. Having the sets of springs oriented to exert their biasing force in a direction directly opposite the direction of travel when the shroud is angularly displaced, tends to hold the ball-and-socket joint together and eliminates a canting, drag force components between the bolts and the socket portion, such components existing in the biasing arrangement disclosed in the above-identified issued patent.

Because the control force, exerted by the solenoids under extreme operating conditions is marginal, elimination of the canting and sliding actions between the spring mounting bolts and the socket portion is highly desirable to increase the torpedo's effectiveness.

A further improvement over the existing design calls for having a stop-screw 30 inwardly of and in the same location as each of the sets of biasing springs. An innermost surface 30a is preferably composed of a material having the properties of the materials identified by the trademarks "Teflon" or "Nylon" to act as a cushioning agent as well as functioning to prevent clicks and noises as the shroud is articulated.

Obviously, many modifications and variations of the present invention are possible in the light of the above teachings, and, it is therefore understood that within the scope of the disclosed inventive concept, the invention may be practiced otherwise than as specifically described.

What is claimed is:

1. In a submersible having a pair of counterrotating propellers mounted on coaxially disposed shafts extending through a fitting to a watertight compartment, an improvement therefor is provided comprising:

an inner shaft sealing assembly fitted in the lateral bore of the inboard propeller including,
a first pair of O-rings in direct rotational and axial slidable engagement against the inner shaft and a first annular reservoir interposed between said first pair of O-rings containing a lubricant cooperating to seal the inner-shaft-outer-shaft juncture and an outer shaft sealing assembly fitted into a cavity provided in said fitting including, a second pair of O-rings in direct rotational and axial slidable engagement against the outer shaft, a second annular reservoir interposed between said second pair of O-rings cooperating to seal the outer-shaft-fitting juncture, and an O-ring carried between said set-screws and said outer shaft on said fitting, all O-rings being provided to ensure a hydrostatic sealing of said watertight compartment, said inner shaft sealing assembly and said outer shaft sealing assembly formed to allow axial excursions of the inner and outer shaft while maintaining said watertight compartment and to permit their removal by releasing said propellers and said fitting from the shafts.

2. A submersible according to claim 1 in which said propellers are mounted on the shafts by propeller set-screws with the inner shaft sealing assembly further including, an O-ring carried between said inboard propeller and the outer surface of said outer shaft.

3. In a submersible having at least one axially extending drive shaft driving a propeller reaching through the ball portion of a ball-and-socket joint and further having prime movers articulating the socket portion of said ball-and-socket joint to displace a shroud to change the submersible's direction of travel, an improvement therefore is provided comprising:

four sets of springs disposed in quadrature urging said shroud to a neutral position carried between said ball portion and said socket portion exerting a directional neutralizing force angularly, in-line opposite to the angular displacement of the articulation of said socket portion minimizing friction; and four "Teflon" studs disposed in quadrature carried between said ball portion and said socket portion for reducing stop-shock when said socket has been articulated.

* * * * *